(12) United States Patent  (10) Patent No.: US 9,199,683 B2
Kitagawa                   (45) Date of Patent:     Dec. 1, 2015

(54) SADDLE RIDING TYPE VEHICLE (71) Applicant: YAMAHA HATSUDOKI KABUSHIKI KAISHA, Shizuoka-ken (JP)

(72) Inventor: Masahiko Kitagawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 15 days.

(21) Appl. No.: 13/954,016

(22) Filed: Jul. 30, 2013

(65) Prior Publication Data
US 2014/0035319 A1 Feb. 6, 2014

(30) Foreign Application Priority Data

Jul. 31, 2012 (JP) .................................. 2012-170199

(51) Int. Cl.
B62J 17/04 (2006.01)
(52) U.S. Cl.
CPC ....................... B62J 17/04 (2013.01)
(58) Field of Classification Search
CPC ....................................... B62J 17/04
USPC ............................. 296/77.1, 78.1
See application file for complete search history.

(56) References Cited

U.S. PATENT DOCUMENTS

| 7,878,571 | B2* | 2/2011 | Misaki et al. ................. 296/78.1 |
| 2003/0062740 | A1 | 4/2003 | Takemura et al. |
| 2006/0028045 | A1 | 2/2006 | Furuhashi et al. |
| 2008/0111392 | A1 | 5/2008 | Masuda et al. |
| 2008/0197658 | A1 | 8/2008 | Yoshitake et al. |

FOREIGN PATENT DOCUMENTS

| EP | 1752367 A2 | 2/2007 |
| JP | 2003-081160 A | 3/2003 |
| JP | 2007-045283 A | 2/2007 |
| JP | 2008-114724 A | 5/2008 |
| JP | 2008-155847 A | 7/2008 |

* cited by examiner

Primary Examiner — Glenn Dayoan
Assistant Examiner — Melissa A Black
(74) Attorney, Agent, or Firm — Rabin & Berdo, P.C.

(57) ABSTRACT

A saddle riding type vehicle including a wind screen elevating device that can support a wind screen in a stable manner is provided. The saddle riding type vehicle includes a meter, a wind screen provided in front of the meter, and a wind screen elevating device that elevates/lowers the wind screen. The wind screen elevating device includes a pair of rails, a pair of sliders, a pair of support members, and a coupling member. The coupling member couples the pair of support members. The coupling member supports the wind screen. The slider includes a plurality of sliding members. The plurality of sliding members is provided side by side in an extending direction of each of the rails. Each of the rails at least partly overlaps the meter in a side view of the vehicle.

16 Claims, 12 Drawing Sheets

VI-VI CROSS SECTION

SADDLE RIDING TYPE VEHICLE

CROSS-REFERENCE TO RELATED APPLICATION

This application is based on, and claims priority to, Japanese Patent Application No. 2012-170199, filed on Jul. 31, 2012, the contents of which are incorporated herein by reference.

BACKGROUND

1. Technical Field

The present invention relates to a saddle riding type vehicle including a wind screen elevating device used to elevate/lower a wind screen.

2. Description of the Background Art

A motorcycle is an example of saddle riding type vehicle. Some motorcycles have a wind screen.

Some wind screens can be elevated/lowered. For example, Patent JP-A 2007-45283 discloses a wind screen position adjuster for motorcycle. In the disclosed wind screen position adjuster for motorcycle includes first support means that changes the level of a wind screen and second support means that changes the angle of the wind screen.

The disclosed wind screen position adjuster for motorcycle needs a large number of parts and a complicated driving mechanism therefor.

SUMMARY

It is an object of the present invention to provide a saddle riding type vehicle including a wind screen elevating device capable of supporting a wind screen in a stable manner while reducing the number of parts.

A saddle riding type vehicle according to the present invention includes a meter, a wind screen, and a wind screen elevating device that elevates/lowers the wind screen. The wind screen is provided in front of the meter. The wind screen elevating device includes a pair of rails, a pair of sliders, a pair of support members, and a coupling member. The rails each extend in a front-back direction and have a front end positioned below a rear end. The pair of sliders is supported by the pair of rails, respectively and movable in extending directions of the respective rails. The pair of support members is coupled to the pair of sliders and movable on the respective rails together with the pair of sliders. The coupling member couples the pair of support members. The coupling member supports the wind screen. The slider includes a plurality of sliding members. The plurality of sliding members is arranged side by side in the extending direction of each of the rails. Each of the rails at least partly overlaps the meter in a side view of the vehicle.

In the saddle riding type vehicle according to the present invention, the slider includes the plurality of sliding members. Therefore, the support members are supported by the sliders in a stable state.

If the sliders each include a plurality of sliding members, the sliders themselves have a prolonged width (size in the extending directions of the rails). Therefore, in order to secure a distance for which the sliders move on the rails and thus a moving range for the wind screen (range of elevating/lowering the screen), the rails must be prolonged. Therefore, in the saddle riding type vehicle according to the present invention, the pair of rails is each extend to the position where the rails at least partly overlap the meter when viewed from the sides of the vehicle. In this way, while the wind screen can be supported in a stable state, the rails may have a sufficient length, and a movable range for the wind screen can be secured.

In the wind screen position adjuster for motorcycle disclosed by the above-mentioned document, the front part of the first guide rail that forms first support means is positioned ahead of the front end of the second guide rail that forms second support means when viewed from a side of the vehicle. When the viewed from a side of the vehicle, the rear part of the first guide rail overlaps the front part of the second guide rail. Therefore, the guide rails used to make the wind screen movable with respect to the front cowl (that projects in the vehicle advancing direction in a plan view of the vehicle) can have a length necessary for making the wind screen movable while the guide rails may be arranged in a compact manner. However, when the first and second rails are integrated and made into a pair of left and right rails, each of the rails is longer than the first and second guide rails. Therefore, the rails could interfere with other components, and this makes it difficult to design the layout of each of the rails.

When the rails are extended above the meter in particular, the front cowl has a large size in the up-down direction. When the rails are arranged in front of the meter, the front cowl has a large size in the front-back or left-right direction of the vehicle.

On the other hand, in the saddle riding type vehicle according to the present invention, a member corresponding to the first guide rail described in the document does not have to be provided between the pair of rails. Therefore, the number of parts necessary for elevating/lowering the wind screen can be reduced. Since the pair of rails is provided in a position that overlaps the meter in a side view of the vehicle, the front cowl can be prevented from having a large size (in the up-down, left-right, and front-back directions of the vehicle). Since the meter is positioned between the pair of rails, a separation distance can be secured between the pair of rails. Therefore, the wind screen can be supported in a stable state.

DESCRIPTION OF THE EMBODIMENTS

Embodiments

Now, a saddle riding type vehicle according to an embodiment of the present invention will be described in conjunction with the accompanying drawings. In the following description, a tourer type motorcycle (touring motorcycle) will be illustrated as an example of the saddle riding type vehicle according to the embodiment. In the drawings, the same or corresponding portions are designated by the same reference characters and their description will not be repeated.

Overall Structure

Figure 1:
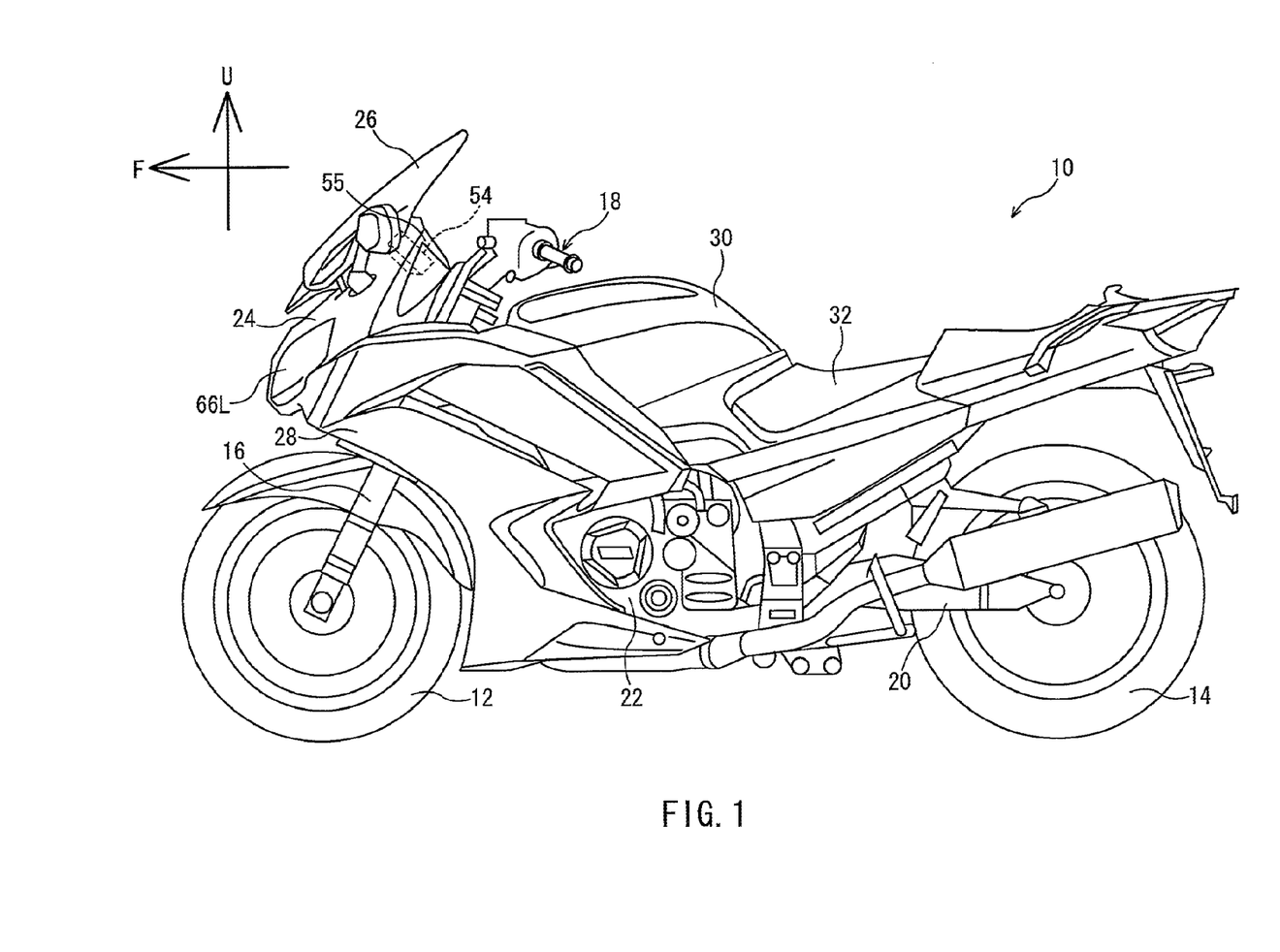
FIG. 1 is a left side view of a motorcycle according to an embodiment of the present invention.
Figure 2:
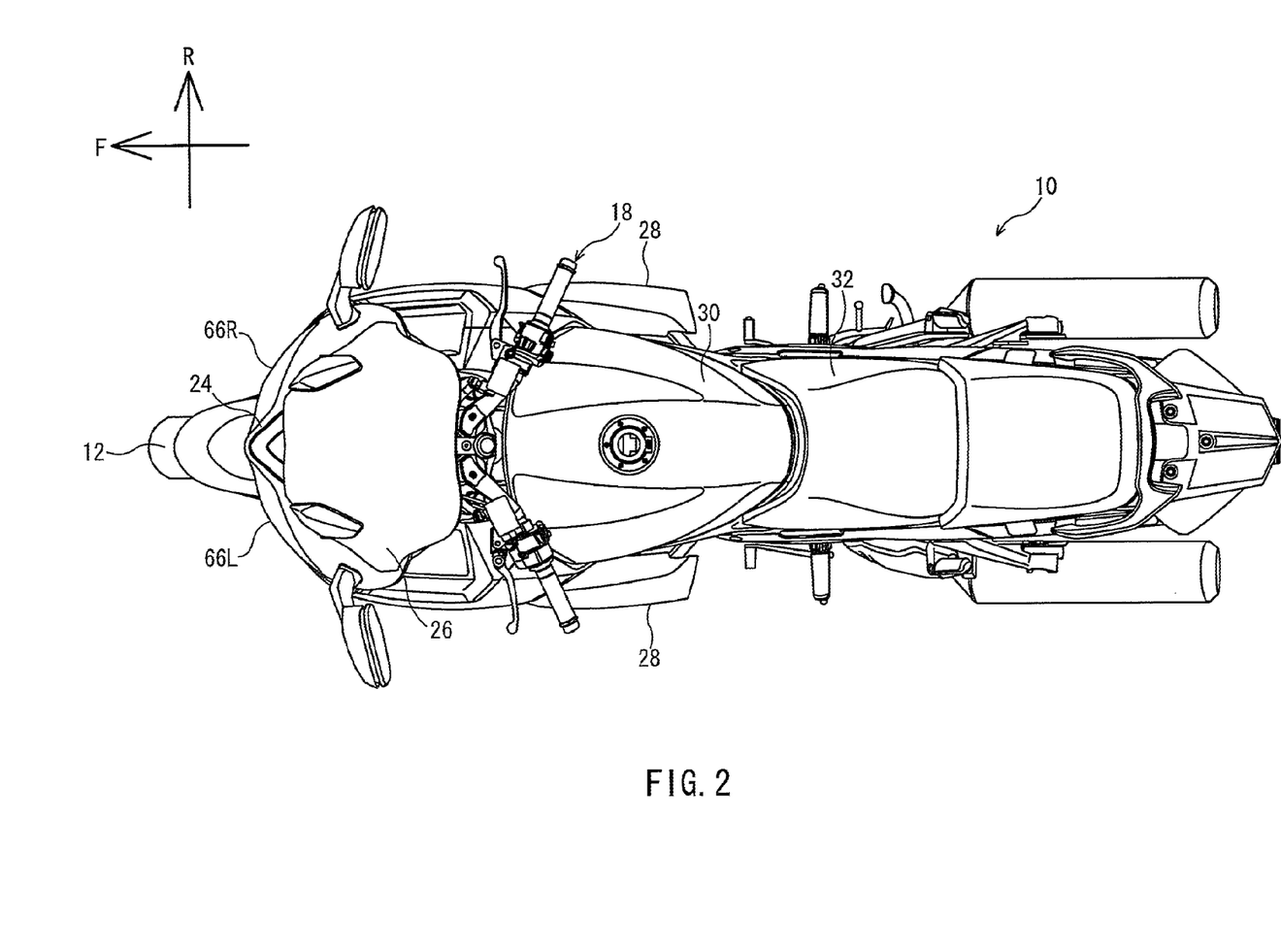
FIG. 2 is a plan view of the motorcycle shown in FIG. 1.

FIG. 1 is a left side view of a motorcycle 10 according to the embodiment of the present invention. FIG. 2 is a plan view of the motorcycle 10. Note that the front, back, left, and right in the following description refer to these directions as viewed from a rider seated on the seat 32 of the motorcycle 10. In FIG. 1, the arrow F indicates the forward direction of the motorcycle 10 and the arrow U indicates the upward direction of the motorcycle 10. In FIG. 2, the arrow F indicates the forward direction of the motorcycle 10 and the arrow R indicates the rightward direction of the motorcycle 10.

The motorcycle 10 includes a front wheel 12 and a rear wheel 14.

The front wheel 12 is supported rotatably by a pair of front suspensions 16. The front wheel 12 rotates in the left-right direction as a handle 18 is operated.

The rear wheel 14 is supported rotatably by a rear arm 20 attached to a vehicle body frame. The rear wheel 14 is provided behind a power unit 22. Motive power transmitted from the power unit 22 rotates the rear wheel 14.

A front cowl 24 is provided in front of the handle 18. The front cowl 24 is provided with a wind screen 26. As shown in FIG. 2, the front cowl 24 projects in the advancing direction of the vehicle in a plan view of the vehicle.

A pair of left and right side cowls 28 is provided at a lower rear part of the front cowl 24. The side cowls 28 are attached to the vehicle body frame. The side cowl 28 covers a front part of a fuel tank 30 in a side view of the vehicle.

In a side view of the vehicle, the seat 32 for a rider is provided behind the fuel tank 30. The seat 32 is positioned above the power unit 22. A rear end of the seat 32 is positioned above the rear wheel 14.

Wind Screen Elevating Device

Figure 3:
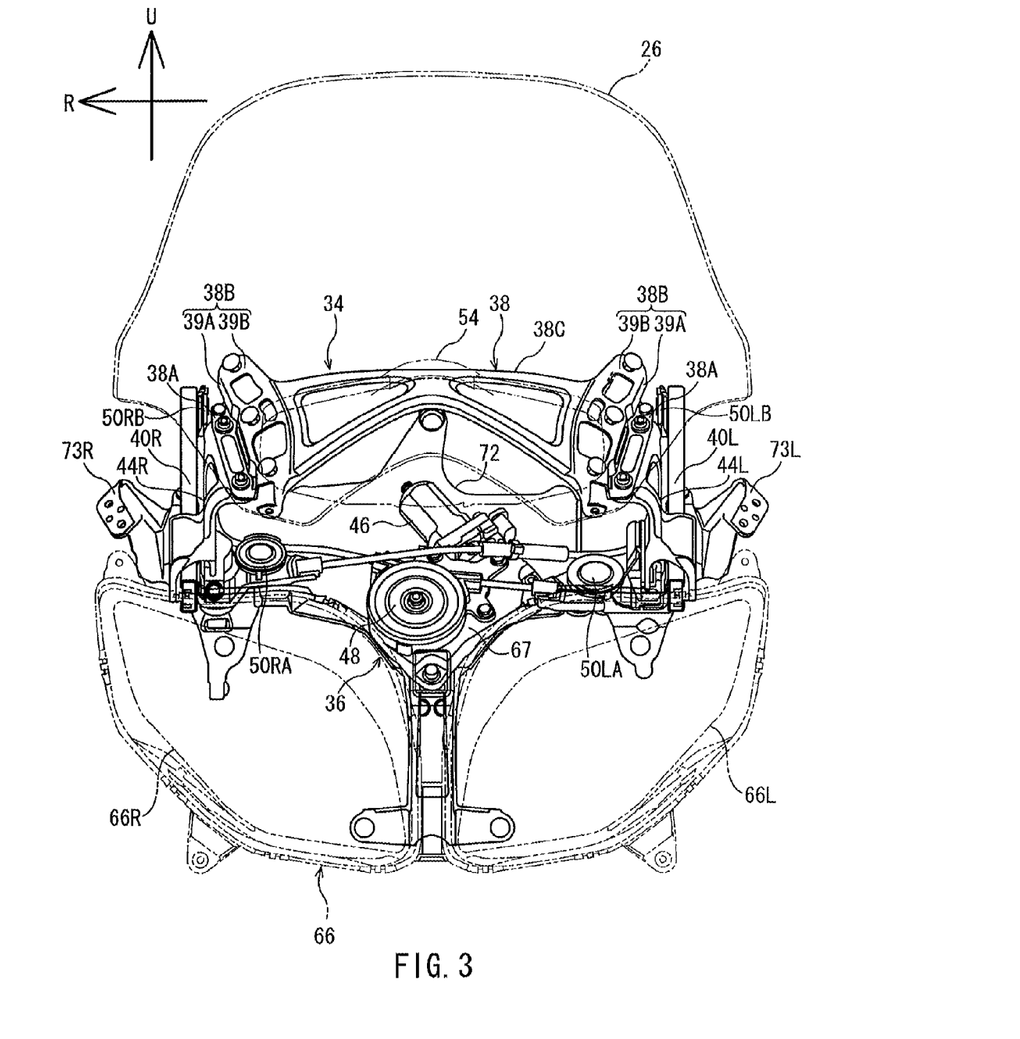
FIG. 3 is a front view of a wind screen elevating device.
Figure 4:
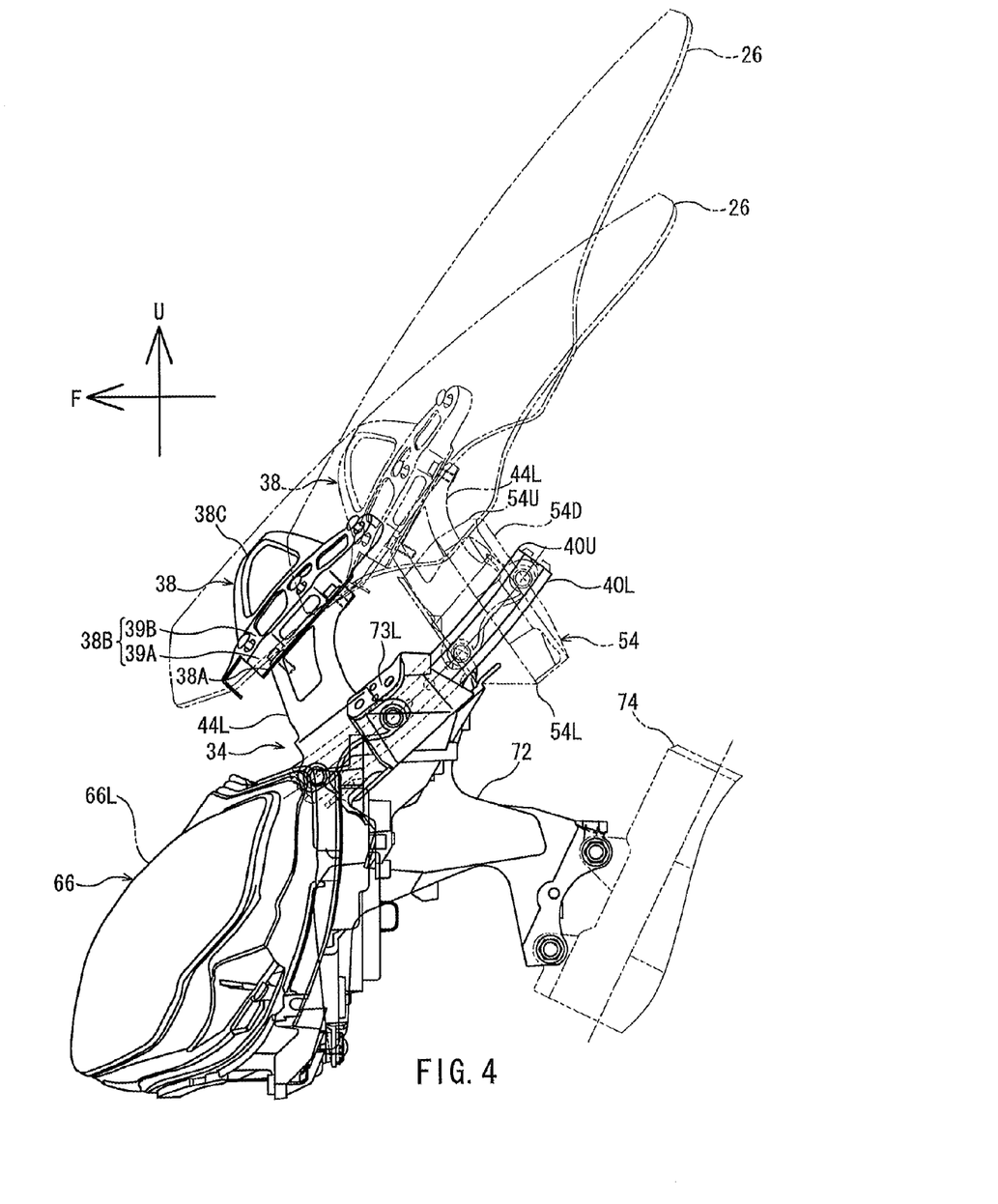
FIG. 4 is a left side view of the wind screen elevating device.

Referring to FIGS. 3 and 4, a wind screen elevating device 34 will be described. FIG. 3 is a front view of the elevating device 34. FIG. 4 is a left side view of the elevating device 34. In FIG. 3, the arrow R indicates the rightward direction of the motorcycle 10, and the arrow U indicates the upward direction of the motorcycle 10. In FIG. 4, the arrow F indicates the forward direction of the motorcycle 10 and the arrow U indicates the upward direction of the motorcycle 10.

The elevating device 34 includes a driving mechanism 36 and a coupling member 38.

Figure 5:
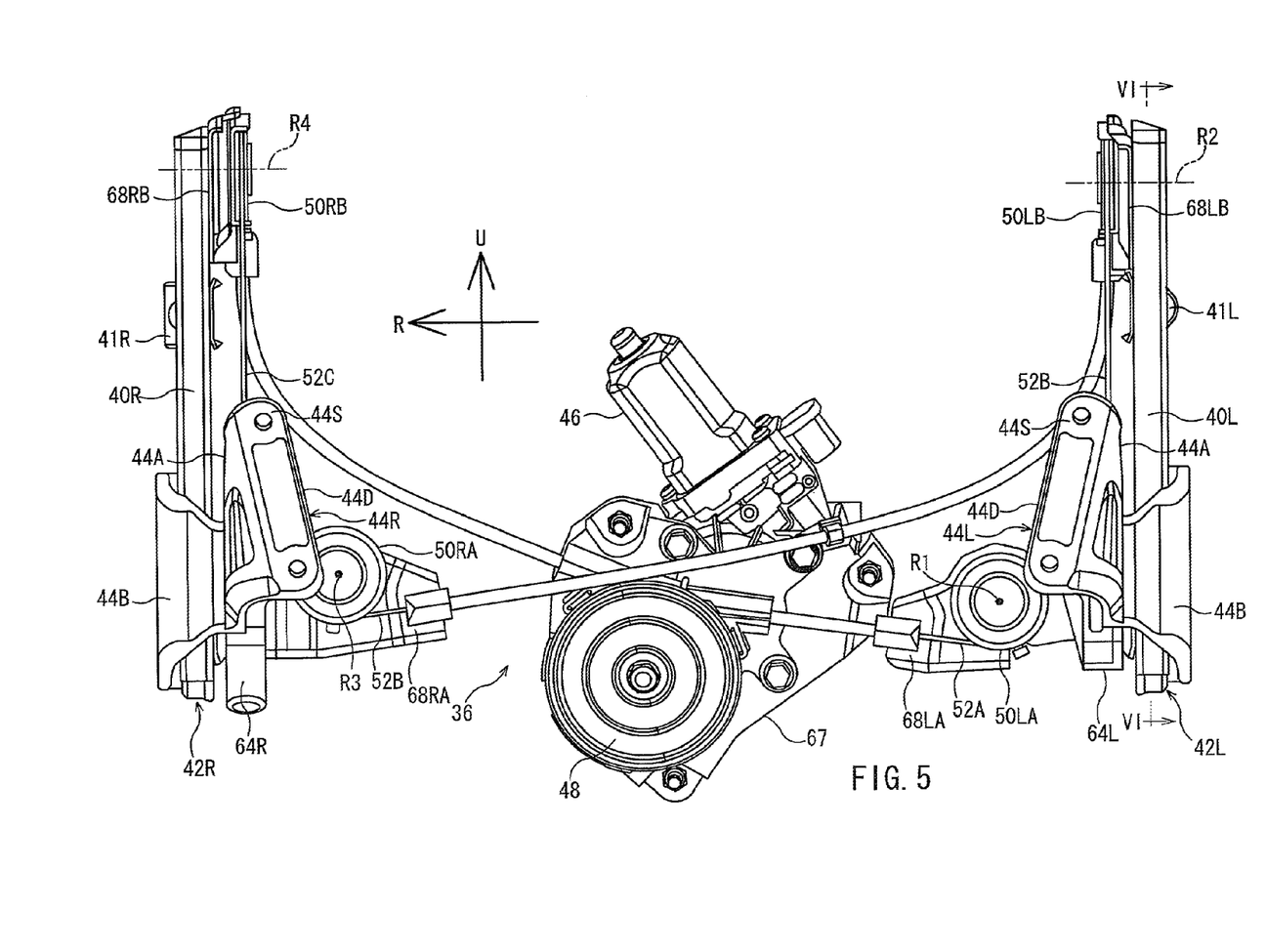
FIG. 5 is a front view of a driving mechanism included in the wind screen elevating device.
Figure 6:
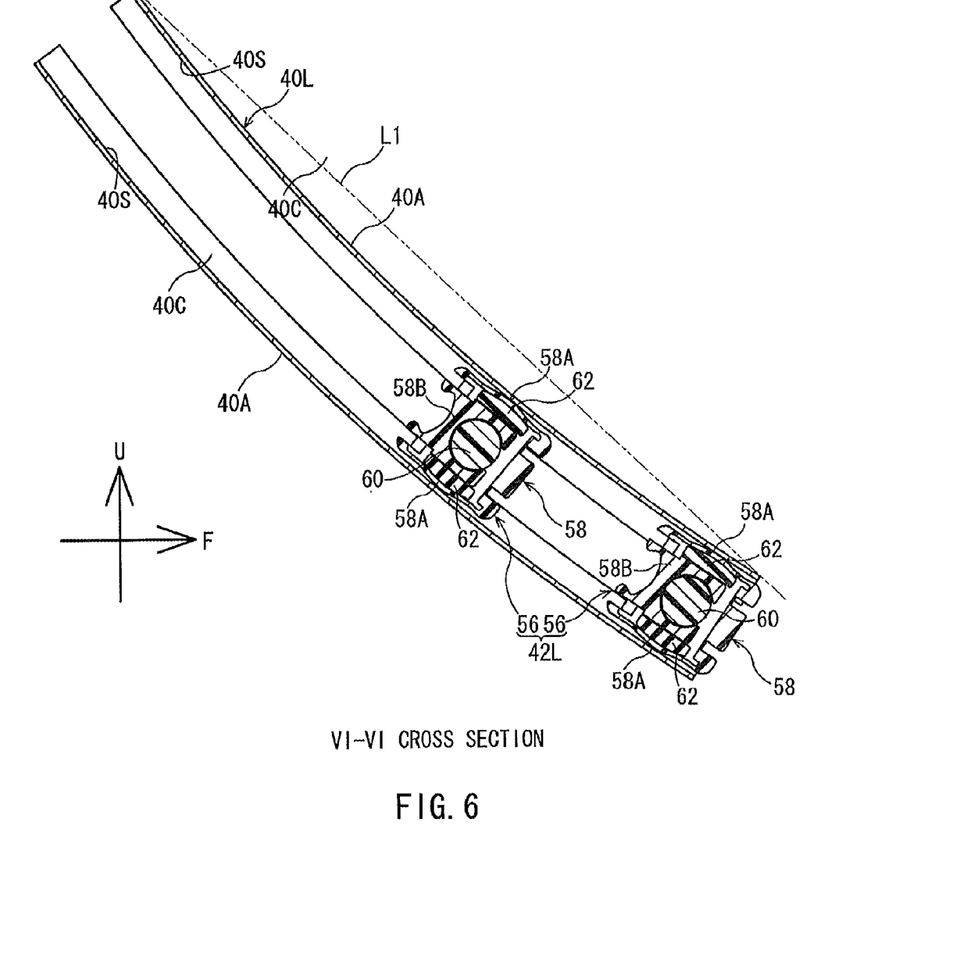
FIG. 6 is a sectional view taken along VI-VI in FIG. 5 showing a slider supported by each of a pair of rails included in the driving mechanism.
Figure 7:
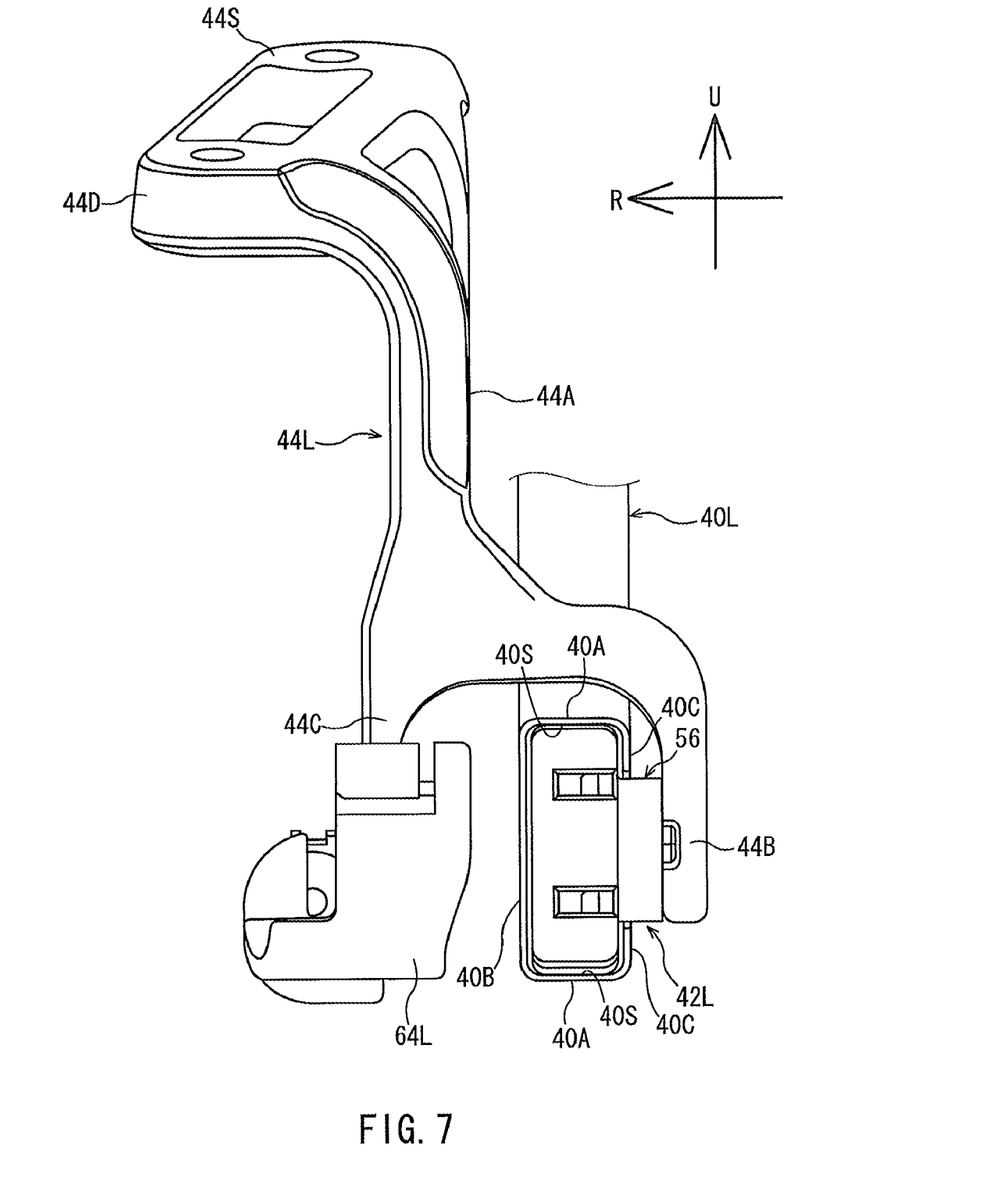
FIG. 7 is a front view showing a relation between a support member and a slider on the left side.

As shown in FIGS. 5 to 7, the driving mechanism 36 includes a pair of rails 40L and 40R, a pair of sliders 42L and 42R, a pair of support members 44L and 44R, a motor 46, a drum 48, a plurality of pulleys 50LA, 50LB, 50RA, and 50RB, and a plurality of wires 52A, 52B, and 52C.

Referring to FIGS. 4 to 7, the pair of rails 40L and 40R will be described. According to the embodiment, the pair of rails 40L and 40R is symmetrically arranged, so that the arrangement of each of the rails 40L and 40R will be described by referring to the rail 40L on the left side shown in FIGS. 4, 6, and 7.

The pair of rails 40L and 40R is made of metal.

The rails 40L and 40R each extend in the front-back direction as shown in FIGS. 4 and 6 and have a front end positioned below a rear end. According to the embodiment, in particular, a central part of each of the rails 40L and 40R in the extending direction is positioned below a straight line L1 that connects front and rear ends of an upper edge of each of the rails 40L and 40R in a side view of the vehicle.

According to the embodiment, as shown in FIG. 4, the rails 40L and 40R each overlap a meter 54 in a side view of the vehicle. As shown in FIG. 1, the meter 54 is provided in front of the handle 18. According to the embodiment, as shown in FIG. 4, a rear end of each of the rails 40L and 40R is positioned behind a display surface 54D of the meter 54 in a side view of the vehicle. According to the embodiment, in particular, an upper edge 40U of the rear end of each of the rails 40L and 40R is positioned behind the display surface 54D of the meter 54. As shown in FIG. 4, according to the embodiment, the rear end of each of the rails 40L and 40R is positioned below an upper end 54U of the meter 54 and above a lower end 54L of the meter 54 in a side view of the vehicle. As shown in FIG. 4, according to the embodiment, the front end of each of the rails 40L and 40R is positioned below an upper end of a headlight unit 66 in a side view of the vehicle.

As shown in FIGS. 6 and 7, the rails 40L and 40R each include a pair of first wall portions 40A, a second wall portion 40B, and a pair of third wall portions 40C.

The first wall portions 40A are provided apart in the up-down direction. The first wall portions 40A each have a slide surface 40S. More specifically, the rails 40L and 40R each include the pair of slide surfaces 40S opposed in the up-down direction.

The second wall portion 40B connects the pair of first wall portions 40A. According to the embodiment, the second wall portion 40B is connected to an edge part on the inner side in the vehicle-widthwise direction at each of the first wall portions 40A.

The pair of third wall portions 40C is provided opposed to the second wall portion 40B in the vehicle-widthwise direction. The third wall portions 40C are provided apart in the up-down direction. One of the third wall portions 40C is connected to an edge part on the outer side in the vehicle-widthwise direction at the upper first wall portion 40A. The other third wall portion 40C is connected to an edge part on the outer side in the vehicle-widthwise direction at the lower first wall portion 40A.

Figure 11:
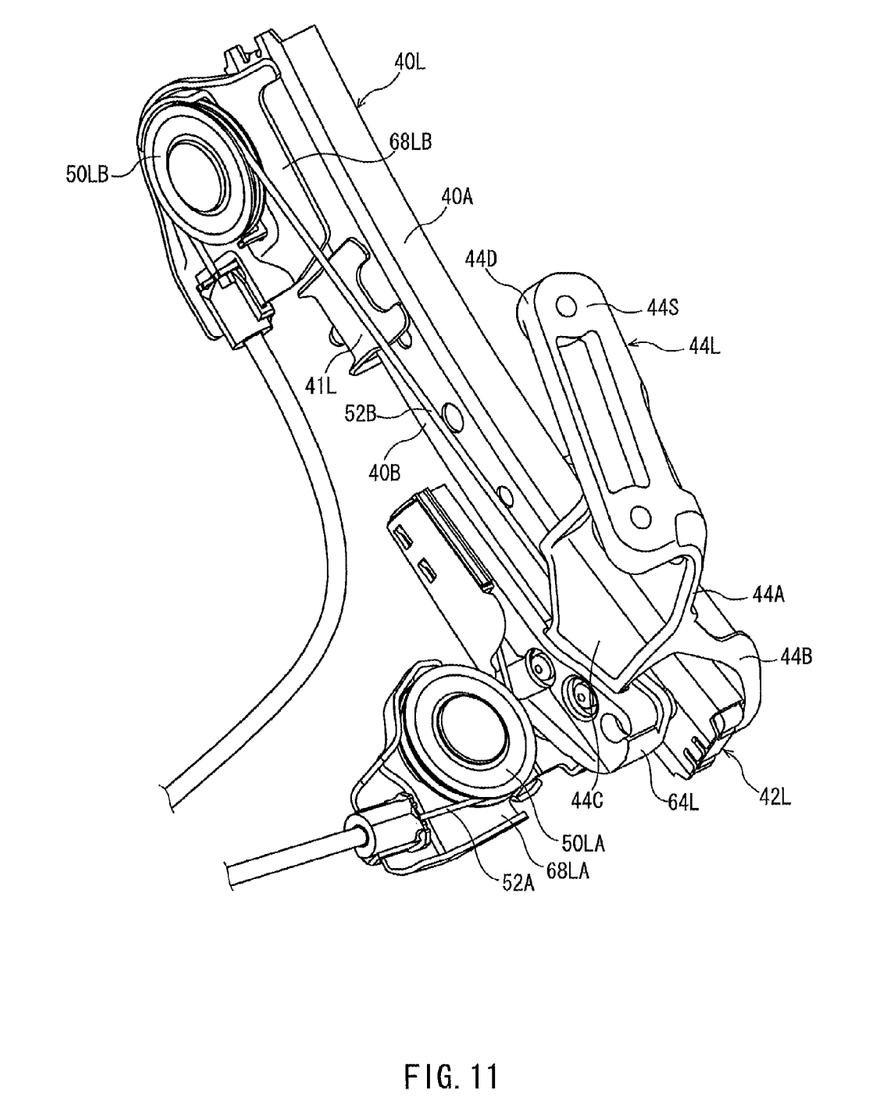
FIG. 11 is a perspective view showing a relation between a first front pulley and a first rear pulley included in the driving mechanism.
Figure 12:
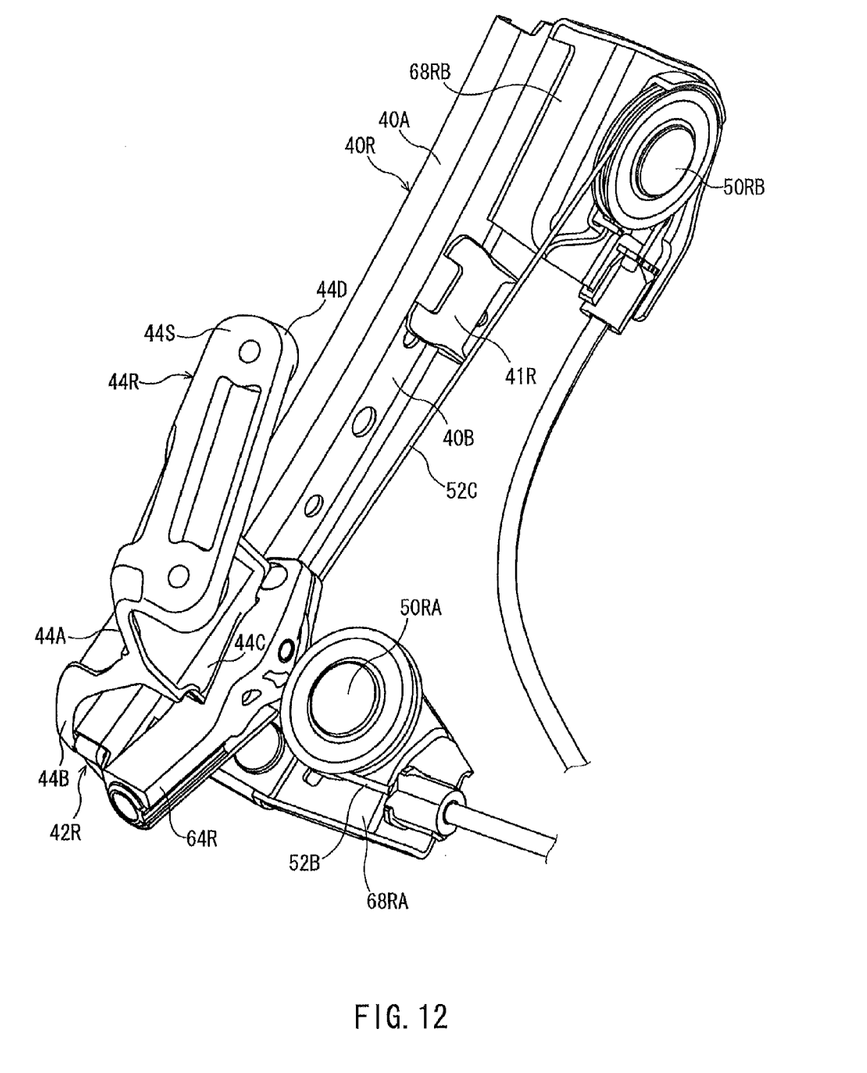
FIG. 12 is a perspective view showing a relation between a second front pulley and a second rear pulley included in the driving mechanism.

The rails 40L and 40R are attached for example to the front cowl 24 through attachment members 41L and 41R, respectively (see FIGS. 5, 11, and 12). The attachment members 41L and 41R are attached to a support member 72 that will be described (see FIGS. 3 and 4) with a stud bolt. The rails 40L and 40R are positioned in the front cowl 24 while they are attached in a prescribed position by the attachment members 41L and 41R, respectively.

Referring to FIGS. 6 and 7, the pair of sliders 42L and 42R will be described. Note that according to the embodiment, the sliders 42L and 42R have identical structures, and therefore the sliders 42L and 42R will be described by referring to the slider 42L provided in the left rail shown in FIGS. 6 and 7.

The sliders 42L and 42R are supported at the rails 40L and 40R, respectively and provided movably along the extending directions of the rails 40L and 40R. The sliders 42L and 42R each include a pair of sliding members 56 as a plurality of sliding members.

As shown in FIG. 6, the sliding members 56 are provided side by side in the extending direction of each of the rails 40L and 40R. The separation distance between the pair of sliding members 56 is set as desired for example depending on the moving distance of the wind screen 26.

Figure 8:
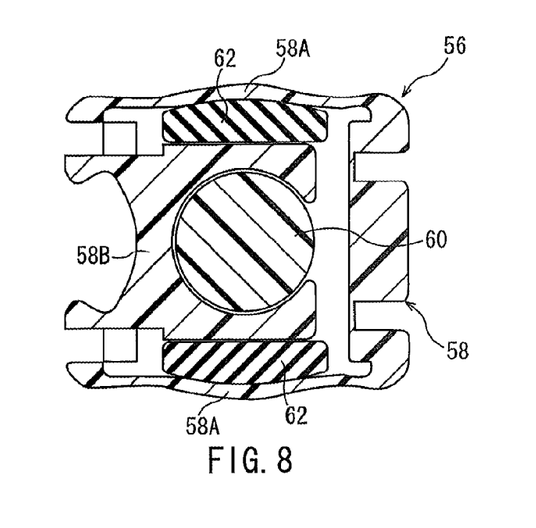
FIG. 8 is a sectional view of a sliding member included in the slider.
Figure 9:
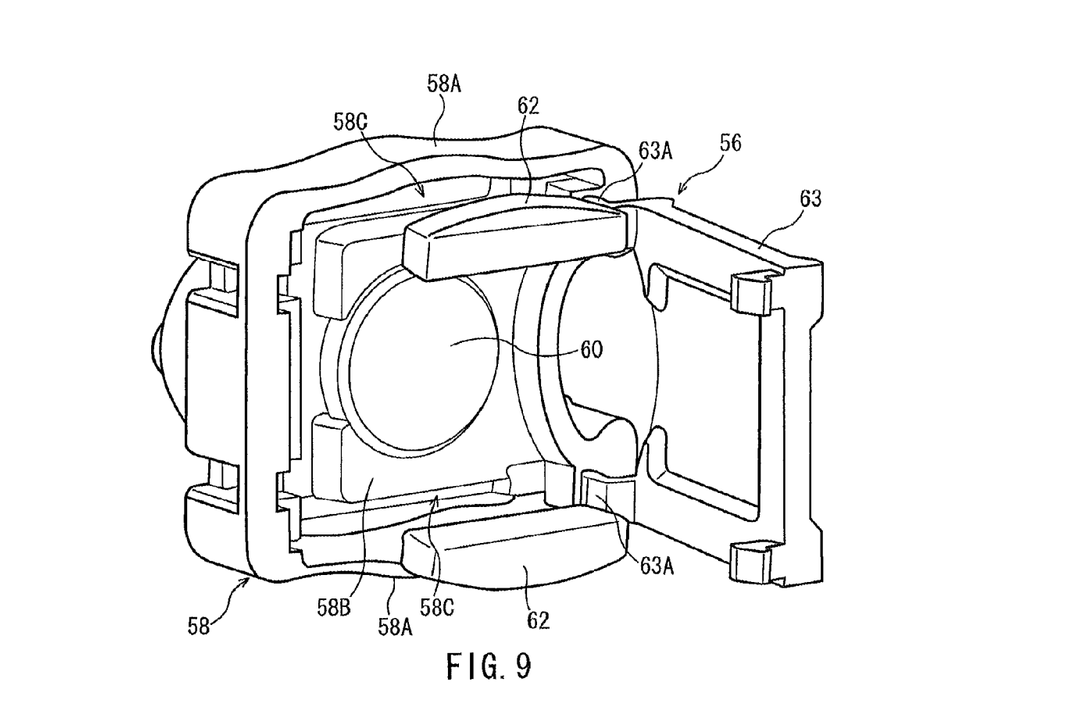
FIG. 9 is a perspective view of the sliding member included in the slider.

Referring to FIGS. 8 and 9, the sliding member 56 will be described. The sliding member 56 includes a main body 58, an attachment shaft 60, and a pair of rubber members 62.

The main body 58 is made of synthetic resin and has a pair of sliding portions 58A. The sliding portions 58A are provided apart in the up-down direction.

The upper sliding portion 58A has its central part protruded upward above both ends thereof in the front-back direction (in the left-right direction in FIG. 8). Therefore, the upper sliding portion 58A is in contact with the upper slide surface 40S in the center in the front-back direction.

The lower sliding portion 58A has its central part protruded downward below both ends thereof in the front-back direction (in the left-right direction in FIG. 8). Therefore, the lower sliding portion 58A is in contact with the lower slide surface 40S in the center in the front-back direction.

The main body 58 includes a support portion 58B. The support portion 58B is formed on the upper and lower sides of the attachment shaft 60.

The attachment shaft 60 is attached to the main body 58. The attachment shaft 60 projects outward in the vehicle-widthwise direction from the main body 58.

The rubber members 62 are provided both above and below the attachment shaft 60 when viewed in the axial direction of the attachment shaft 60 (in the direction orthogonal to the surface of the sheet of FIG. 8).

The rubber member 62 provided on the upper side is positioned in a storage space 58C formed between the upper sliding portion 58A and the support portion 58B. In this way, the upper rubber member 62 is in contact with the upper sliding portion 58A and the support portion 58B.

The lower rubber member 62 is positioned in a storage space 58C formed between the lower sliding portion 58A and the support portion 58B. In this way, the lower rubber member 62 is contact with the lower sliding portion 58A and the support portion 58B.

According to the embodiment, when the sliders 42L and 42R are provided in the rails 40L and 40R, the main body 58 of the sliding member 56 is compressed in a direction in which the first wall portions 40A are opposed to each other. Therefore, the rubber members 62 are both compressed.

The pair of rubber members 62 is prevented from falling from the storage spaces 58C as a cover 63 is closed. The cover 63 is attached to the main body 58 through a hinge 63A.

The rubber member 62 is for example made of chloroprene rubber. The rubber member 62 has for example a hardness of 80.

Figure 10:
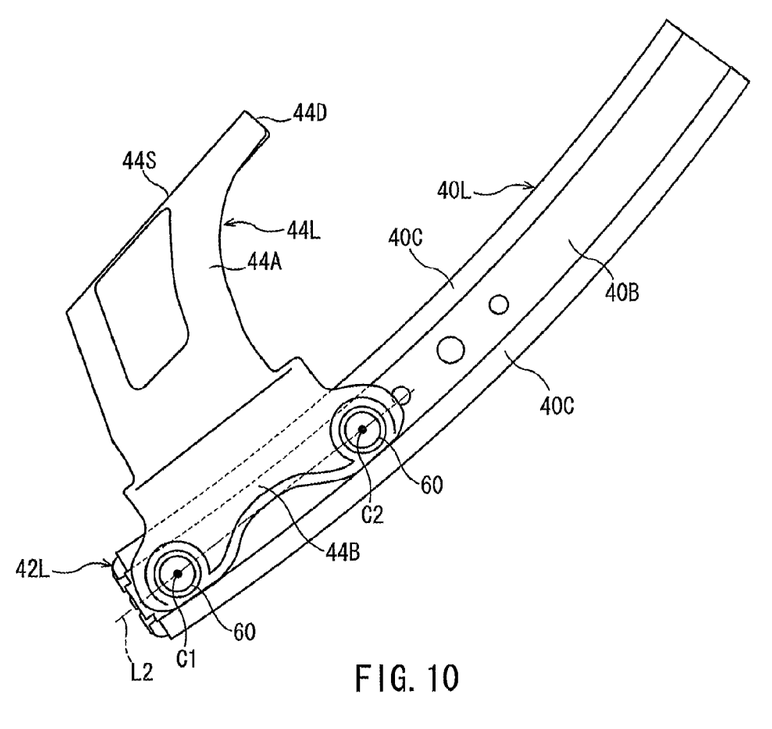
FIG. 10 is a side view of the support member on the left side.

Referring to FIGS. 7 and 10, the pair of support members 44L and 44R will be described. Note that according to the embodiment, the support members 44L and 44R have identical structures, and therefore their structure will be described by referring to the support member 44L on the left side shown in FIGS. 7 and 10.

The support members 44L and 44R are coupled to the sliders 42L and 42R, respectively and provided movably on the rails 40L and 40R together with the sliders 42L and 42R.

The support members 44L and 44R each include a main body 44A, a first attachment portion 44B, a second attachment portion 44C, and a third attachment portion 44D.

The main body 44A extends in the up-down direction. The main body 44A is positioned more on the inner side in the vehicle-widthwise direction than the rails 40L and 40R when viewed in the up-down direction of the vehicle (in the up-down direction in FIG. 7).

The main body 44A is provided in a hole formed in the front cowl 24 while the pair of rails 40L and 40R is attached in a prescribed position. The hole extends in the lengthwise direction of the rails 40L and 40R. When the support members 44L and 44R move on the rails 40L and 40R, respectively, the main bodies 44A move in the hole formed in the front cowl 24 in the extending direction of the hole.

The first attachment portion 44B is provided at a lower end of the main body 44A. When viewed in the up-down direction of the vehicle (in the up-down direction in FIG. 7), the first attachment portions 44B overlap the rails 40L and 40R. More specifically, the first attachment portions 44B are positioned above the rail 40L and 40R. One end of the first attachment portion 44B is positioned more on the outer side than the rail 40L (40R) in the vehicle-widthwise direction.

The first attachment portion 44B is attached to the attachment shaft 60 included in the sliding member 56. Therefore, when the sliders 42L and 42R move, the support members 44L and 44R also move. Note that the first attachment portion 44B may be attached to the attachment shaft 60 for example by fastening with a rivet.

The second attachment portion 44C is provided at a lower end of the main body 44A. The second attachment portion 44C is positioned more on the inner side than each of the rails 40L and 40R in the vehicle-widthwise direction.

The second attachment portions 44C are attached with movable members 64L and 64R. Therefore, the sliders 42L and 42R move when the movable members 64L and 64R move.

The third attachment portion 44D is provided at an upper end of the main body 44A. The third attachment portions 44D are positioned on the outer side of the front cowl 24 while the pair of the rails 40L and 40R is attached in a prescribed position. The third attachment portion 44D includes an attachment surface 44S. The attachment surface 44S is provided with the coupling member 38.

As shown in FIG. 7, a front part of the third attachment portion 44D is positioned more on the inner side than its rear part in the vehicle widthwise direction. Therefore, the connection part between the third attachment portion 44D and the main body 44A is twisted inward in the vehicle widthwise direction. As a result, sufficient strength is secured for the support members 44L and 44R.

As shown in FIG. 10, in a side view of the support member 44L (44R), the attachment surface 44S and a straight line L2 that connects centers C1 and C2 of the pair of sliding members 56 extend in a forward and obliquely downward direction. In a side view of the support member 44L (44R), the attachment surface 44S is inclined at a greater angle than the angle formed by the straight line L2 with respect to the horizontal direction. In the example shown in FIG. 10, the centers C1 and C2 of the sliding members 56 match the centers of the attachment shafts 60 of the sliding members 56.

As shown in FIGS. 3 and 5, the motor 46 is provided between the pair of rails 44L and 44R in a front view of the vehicle. The motor 46 drives the drum 48. The motor 46 is for example a geared motor including a speed reducer such as a reduction gear train.

As shown in FIGS. 3 and 5, the drum 48 is provided between the pair of rails 44L and 44R in a front view of the vehicle. The drum 48 is provided below the motor 46 in a front view of the vehicle.

As shown in FIG. 3, the drum 48 is provided above the headlight unit 66 included in the motorcycle 10. As shown in FIG. 3, according to the embodiment in particular, the drum 48 is provided between the pair of headlights 66L and 66R included in the headlight unit 66. As shown in FIG. 3, a part of the drum 48 is positioned below upper ends of the headlights 66L and 66R.

As shown in FIGS. 3 and 5, the motor 46 and the drum 48 are attached to the attachment member 67. As shown in FIG. 3, the attachment member 67 is provided between the pair of headlights 66L and 66R. As shown in FIG. 3, a part of the attachment member 67 is positioned below the upper ends of the headlights 66L and 66R. The attachment member 67 is for example attached to the support member 72 (see FIGS. 3 and 4). The support member 72 attaches the pair of headlights 66L and 66R to the head pipe 74 included in the vehicle body frame. The support member 72 includes attachment portions 73L and 73R. The attachment portions 73L and 73R are attached to the front cowl 24.

As shown in FIG. 5, the plurality of pulleys 50LA, 50LB, 50RA, and 50RB include a first front pulley 50LA, a first rear pulley 50LB, a second front pulley 50RA, and a second rear pulley 50RB.

The first front pulley 50LA is attached to a front part of the rail 40L, one of the pair of rails 40L and 40R. More specifically, the first front pulley 50LA is attached to the front part of the rail 40L through an attachment member 68LA.

The attachment member 68LA is provided below the movable member 64L. The attachment member 68LA is attached to the support member 72 for example by a stud bolt provided at its lower surface.

The rotation central axis R1 of the first front pulley 50LA extends in the direction in which the slide surfaces 40S of the rail 40L are opposed. According to the embodiment, the rotation central axis R1 of the first front pulley 50LA extends in a forward and obliquely upward direction.

The first rear pulley 50LB is attached to a rear part of the rail 40L. More specifically, the first rear pulley 50LB is attached to the rear part of the rail 40L through the attachment member 68LB. The attachment member 68LB is attached to the rail 40L.

The rotation central axis R2 of the first rear pulley 50LB extends in a direction in which the rails 40L and 40R are opposed (in the vehicle-widthwise direction). More specifically, the rotation central axis R2 of the first rear pulley 50LB is orthogonal to the rotation central axis R1 of the first front pulley 50LA.

The second front pulley 50RA is attached to a front part of the rail 40R, the other one of the pair of rails 40L and 40R. More specifically, the first front pulley 50RA is attached to the front part of the rail 40R through the attachment member 68RA.

The attachment member 68RA is provided below the movable member 64R. The attachment member 68RA is attached to the support member 72 for example by a stud bolt provided at its lower surface.

The rotation central axis R3 of the second front pulley 50RA extends in a direction in which the slide surfaces 40S of the rail 40R are opposed. According to the embodiment, the rotation central axis R3 of the second front pulley 50RA extends in a forward and obliquely upward direction.

The second rear pulley 50RB is attached to a rear part of the rail 40R. More specifically, the second rear pulley 50RB is attached to the rear part of the rail 40R through an attachment member 68RB. The attachment member 68RB is attached to the rail 40R.

The rotation central axis R4 of the second rear pulley 50RB extends in a direction in which the rails 40L and 40R are opposed (in the vehicle-widthwise direction). More specifically, the rotation central axis R4 of the second rear pulley 50RB is orthogonal to the rotation central axis R3 of the second front pulley 50RA.

As shown in FIG. 5, a plurality of wires 52A, 52B, and 52C include a first wire 52A, a second wire 52B, and a third wire 52C.

As shown in FIG. 5, one end of the first wire 52A is attached to the drum 48. As shown in FIG. 11, the other end of the first wire 52A is attached to the movable member 64L. The first wire 52A connects the drum 48 and the movable member 64L through the first front pulley 50LA.

As shown in FIG. 11, one end of the second wire 52B is attached to the movable member 64L. As shown in FIGS. 5 and 12, the other end of the second wire 52B is attached to the movable member 64R through the second front pulley 50RA. As shown in FIGS. 5, 11, and 12, the second wire 52B connects the movable members 64L and 64R through the first rear pulley 50LB and the second front pulley 50RA.

As shown in FIGS. 5 and 12, one end of the third wire 52C is attached to the drum 48. As shown in FIG. 12, the other end of the third wire 52C is attached to the movable member 64R. The third wire 52C connects the drum 48 and the movable member 64R.

Figure 13:
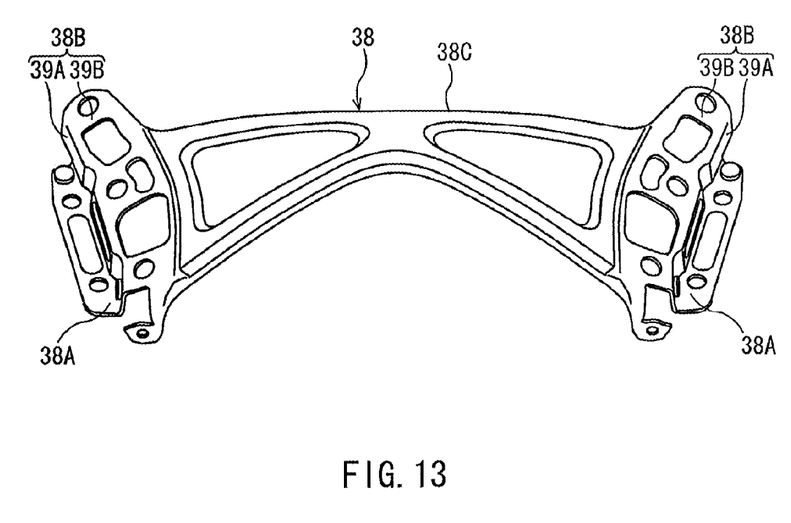
FIG. 13 is a front view of a coupling member.

Referring to FIGS. 3, 4 and 13, the coupling member 38 will be described.

An attachment portion 38A is provided at both ends of the coupling member 38 in the vehicle widthwise direction. The attachment portion 38A is attached to an attachment surface 44S formed at each of the support members 44L and 44R. In this way, the coupling member 38 couples the pair of support members 44L and 44R. The coupling member 38 is positioned on the outer side of the front cowl 24.

According to the embodiment, the support members 44L and 44R each include the main body 44A that extends in the up-down direction. Therefore, the coupling member 38 is supported at the pair of support members 44L and 44R in a position apart in the upward direction from the pair of rails 40L and 40R. As a result, if the motor 46 and the drum 48 are provided between the pair of rails 40L and 40R, the coupling member 38 is unlikely to interfere with the motor 46 and the drum 48. This also makes it easier to provide the coupling member 38 on the outer side of the front cowl 24.

The coupling member 38 is provided with a support portion 38B more on the inner side than the attachment portion 38A in the vehicle widthwise direction. The support portion 38B includes a first wall portion 39A and a second wall portion 39B.

The first wall portion 39A is connected to an edge of the attachment portion 38A on the inner side in the vehicle widthwise direction. The first wall portion 39A extends upward from the attachment portion 38A (in a forward and obliquely upward direction according to the embodiment).

The second wall portion 39B extends inward in the vehicle widthwise direction from an upper end of the first wall portion 39A. The second wall portion 39B is attached with the wind screen 26. More specifically, the coupling member 38 supports the wind screen 26. The wind screen 26 is positioned on the outer side of the front cowl 24.

According to the embodiment, the support portion 38B includes the first wall portion 39A that extends upward from the attachment portion 38A. Therefore, the second wall portion 39B attached with the wind screen 26 is positioned above the attachment portion 38A attached to each of the support members 44L and 44R. As a result, the coupling member 38 is unlikely to interfere with the motor 46 and the drum 48 provided between the pair of rails 40L and 40R.

According to the embodiment, the attachment position for a rear part of the wind screen 26 is more on the outer side than the attachment position for its front part in the vehicle-widthwise direction. Therefore, the flapping of the wind screen 26 can be reduced.

The coupling member 38 is provided with a connection portion 38C that connects the pair of support portions 38B. As shown in FIGS. 3 and 4, a central part of the connection portion 38C in the vehicle widthwise direction is positioned obliquely above and ahead of both ends of the connection portion 38C in the vehicle widthwise direction. Therefore, the coupling member 38 is unlikely to interfere with the motor 46 and the drum 48 provided between the pair of rails 40L and 40R. Note that the wind screen 26 is apart from the connection portion 38C. More specifically, there is a gap between the wind screen 26 and the connection portion 38C. In this way, noise caused by wind as the motorcycle 10 travels can be reduced.

Now, the elevating/lowering of the wind screen 26 using the elevating device 34 will be described with reference to FIGS. 3 to 5 and FIGS. 11 and 12.

Elevating Wind Screen

First, the motor 46 is driven. The driving force of the motor 46 is transmitted to the drum 48. In this way, the drum 48 is rotated in a prescribed direction.

At the time, the third wire 52C is taken up around the drum 48. In this way, the movable member 64R moves backward along the rail 40R. As a result, the support member 44R moves backward along the rail 40R.

When the movable member 64R moves backward along the rail 40R, the second wire 52B pulls the movable member 64L backward. In this way, the movable member 64L moves backward along the rail 40L. As a result, the support member 44L moves backward along the rail 40L.

The pair of support members 44L and 44R moves backward along the rails 40R and 40L, respectively, so that the coupling member 38 moves backward. Here, the rear ends of the rails 40R and 40L are positioned above their front ends. As a result, the wind screen 26 is elevated while it moves backward.

Lowering Wind Screen

First, the motor 46 is driven in the reverse direction to the direction when the wind screen 26 is elevated. The driving force of the motor 46 is transmitted to the drum 48. In this way, the drum 48 rotates in the reverse direction to the direction when the wind screen 26 is elevated.

At the time, the first wire 52A is taken up around the drum 48. In this way, the movable member 64L moves forward along the rail 40L. As a result, the support member 44L moves forward along the rail 40L.

When the movable member 64L moves forward along the rail 40L, the second wire 52B pulls the movable member 64R forward. In this way, the movable member 64R moves forward along the rail 40R. As a result, the support member 44R moves forward along the rail 40R.

The support members 44L and 44R move forward along the rails 40R and 40L, respectively, so that the coupling member 38 moves forward. Here, the front ends of the rails 40R and 40L are positioned below their rear ends. As a result, the wind screen 26 is lowered as it moves forward.

The wind screen 26 is elevated/lowered for example by a rider operating an operation switch or based on the vehicle speed of the motorcycle 10.

The motorcycle 10 includes the meter 54, the wind screen 26 provided in front of the meter 54, and the wind screen elevating device 34 that elevates/lowers the wind screen 26. The wind screen elevating device 34 includes the pair of rails 40L and 40R, the pair of sliders 42L and 42R, the pair of support members 44L and 44R, and the coupling member 38. The rails 40L and 40R extend in the front-back direction and have their front ends positioned below their rear ends. The slider 42L and 42R are supported by the rails 40L and 40R, respectively and can move in the extending directions of the rails 40L and 40R. The support members 44L and 44R are coupled to the sliders 42L and 42R, respectively and movable on the rails 40L and 40R together with the pair of sliders 42L and 42R. The coupling member 38 couples the pair of support members 44L and 44R. The coupling member 38 supports the wind screen 26. The sliders 42L and 42R each include a pair of sliding members 56. The sliding members 56 are provided side by side in the extending directions of the rails 40L and 40R. The rails 40L and 40R each partly overlap the meter 54 in a side view of the vehicle.

In the motorcycle 10 as described above, the coupling member 38 that couples the pair of support members 44L and 44R supports the wind screen 26. Therefore, the pair of support members 44L and 44R is unlikely to move variably. As a result, the wind screen 26 can be supported more stably than the case of attaching the wind screen 26 to the pair of support members 44L and 44R.

In the motorcycle 10, the sliders 42L and 42R each include the pair of sliding members 56. Therefore, the support members 44L and 44R are supported in a stable state by the sliders 42L and 42R.

If the sliders 42L and 42R each include the pair of sliding members 56, the sliders 42L and 42R themselves have prolonged sizes (in the extending directions of the rails 40L and 40R). Therefore, in order to secure a distance for which the sliders 42L and 42R move on the rails 40L and 40R and thus a moving range (range of elevating/lowering) for the wind screen 26, the rails 40L and 40R must be prolonged. Therefore, in the motorcycle 10, the pair of rails 40L and 40R extends to the position where they at least partly overlap the meter 54 in a side view of the vehicle. In this way, while the wind screen 26 can be supported in a stable state, the rails 40L and 40R can have a sufficient length, and a movable range for the wind screen 26 can be secured.

In the motorcycle 10, the support members 44L and 44R are moved on the rails 40L and 40R, so that the wind screen 26 is elevated/lowered. Therefore, the number of parts necessary for elevating/lowering the wind screen 26 can be reduced.

In the motorcycle 10, the rails 40L and 40R are provided in a position where they overlap the meter 54 in a side view of the vehicle, the front cowl 24 can be prevented from having a large size (in the up-down, left-right, and front-back directions of the vehicle).

In the motorcycle 10, the meter 54 is positioned between the pair of rails 40L and 40R, so that a separation distance can be secured between the rails 40L and 40R. Therefore, the wind screen 26 can be supported in a stable state.

In the motorcycle 10, in a side view of the vehicle, the rails 40L and 40R have their rear ends positioned behind the display surface 54D of the meter 54. Therefore, the rails 40L and 40R can have a sufficient length.

In the motorcycle 10, in a side view of the vehicle, upper edges 40U of the rear ends of the rails 40L and 40R are positioned behind the display surface 54D of the meter 54. Therefore, the rails 40L and 40R can have an even larger length.

In this way, when the rear ends of the rails 40L and 40R are positioned behind the display surface 54D of the meter 54, a cover 55 used to cover the rails 40L and 40R is provided on the sides of the meter 54 (see FIG. 1). The cover 55 can block incoming light to the display surface 54D. As a result, the difficulty of recognizing information (e.g., mileage motorcycle 10, estimated fuel motorcycle 10, information related to the motorcycle 10, etc.) displayed at the display surface 54 caused by light reflected by the display surface 54D can be avoided.

The meter 54 of the motorcycle 10 is shorter than the wind screen 26 and the headlight unit 66 in the vehicle-widthwise direction (in the left-right direction in FIG. 3) as shown in FIG. 3 and provided in a compact manner in the center in the vehicle-widthwise direction so that a rider can surely get necessary information such as the traveling state and the vehicle state at a glance. More specifically, in the vehicle-widthwise direction, the meter 54 is narrower than the front cowl 24 in the vehicle-widthwise direction, and there is a space on the sides of the meter 54. The rails 40L and 40R are provided in the space, so that the wind screen 26 can be supported in a stable state, while the rails 40L and 40R can have a sufficient length and a movable range can be secured for the wind screen 26.

In the motorcycle 10, the central parts of the rails 40L and 40R in the extending directions are positioned below the straight line L1 that connects the front and rear ends of the upper edge of each of the rails 40L and 40R in a side view of the vehicle. This makes it easier to arrange the wind screen 26 upright. This can also secure a moving distance in the up-down direction for the wind screen 26.

In the motorcycle 10, the rails 40L and 40R each include the slide surfaces 40S opposed in the up-down direction. The sliders 42L and 42R are in contact with the slide surfaces 40S.

In this way, the sliders 42L and 42R can be restrained from flapping. As a result, the flapping of the support members 44L and 44R attached to the sliders 42L and 42R can be reduced.

In the motorcycle 10, the storage spaces 58C are formed for the pair of sliding members 56. The rubber members 62 are provided in the storage spaces 58C.

In this way, the rubber members 62 deform elastically to reduce the vibration of the sliding members 56. As a result, the flapping of the sliders 42L and 42R can be reduced.

In the motorcycle 10, the support members 44L and 44R include the attachment surfaces 44S to which the coupling member 38 is attached. In a side view of the support members 44L and 44R, the attachment surfaces 44S are inclined at a greater angle than the angle formed by the straight line L2 that connects the centers C1 and C2 of the sliding members 56 with respect to the horizontal direction.

In this way, the wind screen 26 can be more easily arranged upright.

In the motorcycle 10, the wind screen elevating device 34 further includes the motor 46, the drum 48, the first front pulley 50LA, the first rear pulley 50LB, the second front pulley 50RA, the second rear pulley SORB, the first wire 52A, the second wire 52B, and the third wire 52C. The motor 46 drives the drum 48. The first front pulley 50LA is attached to a front part of the rail 40L, one of the pair of the rails 40L and 40R. The first rear pulley 50LB is attached to a rear part of the rail 40L. The second front pulley 50RA is attached to a front part of the rail 40R, the other one of the pair of rails 40L and 40R. The second front pulley 50RA is attached to a rear part of the rail 40R. The first wire 52A has one end attached to the drum 48 and the other end attached to the first movable member 64L (that is assembled into the rail 40L) through the first front pulley 50LA. The second wire 52B has one end attached to the first movable member 64L and the other end attached to the second movable member 64R (that is assembled into the other rail 40R) through the first rear pulley 50LB and the second front pulley 50LA. The third wire 52C has one end attached to the drum 48 and the other end attached to the second movable member 64R through the second rear pulley 50RB. The rotation axes R2 and R4 of the first and second rear pulleys 50LB and 50RB extend in the direction in which the rails 40L and 40R are opposed.

In this way, the pair of rails 40L and 40R can be positioned close to the meter 54.

In the motorcycle 10, in a front view of the vehicle, the motor 46 and the drum 48 are provided between the pair of the rails 40L and 40R. In this way, the space formed between the pair of rails 40L and 40R can be utilized effectively.

The tourer type motorcycle has been described above as the embodiment, but the present invention is not limited to the type of motorcycle. For example, the present invention may be employed in a motorcycle other than a touring motorcycle, or in a three- or four-wheeled leaning vehicle.

Although the embodiment of the present invention has been described and illustrated, it is clearly understood that the same is by way of illustration and example only. Therefore, the invention is not limited to the above-described embodiment and can be subject to variations and modifications without departing the scope and spirit of the present invention.

What is claimed is:

1. A saddle riding type vehicle, comprising:
   a meter;
   a wind screen provided in front of the meter; and
   a wind screen elevating device that elevates and lowers the wind screen, the wind screen elevating device including
      a pair of rails each
         extending in a front-back direction of the vehicle,
         having a front end thereof positioned below a rear end thereof, and
         at least partly overlapping the meter in a side view of the vehicle, a pair of sliders each
         being supported by a respective one of the rails,
         being movable along the respective one rail, and
         including a plurality of sliding members that are arranged side by side in an extending direction that the respective one rail extends in,
      a pair of support members coupled to the sliders and movable along the rails through the sliders, and
      a coupling member that couples to each of the support members, the coupling member supporting the wind screen, the coupling member being in direct contact with the wind screen.

2. The saddle riding type vehicle according to claim 1, wherein the meter includes a display surface for displaying information related to the saddle riding type vehicle,
   further wherein in the side view of the vehicle, each of said rear ends of the rails is positioned further rearward than the display surface of the meter.

3. The saddle riding type vehicle according to claim 2, wherein in the side view of the vehicle, each of said rear ends of the rails includes an upper edge positioned further rearward than the display surface of the meter.

4. The saddle riding type vehicle according to claim 1, wherein the meter has an uppermost end and a lowermost end,
   further wherein in the side view of the vehicle, each of said rear ends of the rails is positioned below the uppermost end of the meter and above the lowermost end of the meter.

5. The saddle riding type vehicle according to claim 1, wherein in the side view of the vehicle, each of the rails includes in the extending direction thereof a central part that is positioned below a straight line connecting an upper edge of the front end of the respective rail and an upper edge of the rear end of the respective rail.

6. The saddle riding type vehicle according to claim 1, wherein each of the rails includes a pair of slide surfaces that oppose each other in an up-down direction, and further wherein the sliders are in contact with the slide surfaces.

7. The saddle riding type vehicle according to claim 1, wherein each of the plurality of sliding members includes a storage space, the saddle riding type vehicle further comprising rubber members, each storage space including one of the rubber members.

8. The saddle riding type vehicle according to claim 1, wherein each of the support members comprises an attachment surface to which the coupling member is attached, and further wherein in the side view of the vehicle, each of the attachment surfaces forms a first angle with a horizontal direction, a straight line that connects centers of the plurality of sliding members forms a second angle with the horizontal direction, and the first angle is larger than the second angle.

9. The saddle riding type vehicle according to claim 1, wherein the wind screen elevating device further comprises:

a motor;
a drum driven by the motor;
a first front pulley attached to a front part of one of the pair of rails;
a first rear pulley attached to a rear part of said one rail that the first front pulley is attached to;
a first movable member disposed on said one rail that the first front pulley is attached to;
a first wire having one end attached to the drum and another end attached to the first movable member through the first front pulley;
a second front pulley attached to a front part of the other rail of the pair of rails;
a second rear pulley attached to a rear part of said other rail;
a second movable member disposed on said other rail;
a second wire having one end attached to the first movable member and another end attached to the second movable member; and
a third wire having one end attached to the drum and another end attached to the second movable member through the second rear pulley, and
wherein rotation axes of the first rear pulley and the second rear pulley extend in a direction in which the rails are opposed to each other.

10. The saddle riding type vehicle according to claim 9, wherein the motor and the drum are provided between the pair of rails in a front view of the vehicle.

11. The saddle riding type vehicle according to claim 1, wherein each of the support members is supported by the plurality of the sliding members, and wherein the support members each includes an attachment surface to which the coupling member is attached, and in the side view of the vehicle
the attachment surface forms a first angle with a horizontal direction,
a straight line, that connects centers of the sliding members that support the support member, forms a second angle with the horizontal direction, the second angle being smaller than the first angle.

12. The saddle riding type vehicle according to claim 1, wherein each rail supports one of the sliders.

13. The saddle riding type vehicle according to claim 1, wherein one of the sliders is supported by one of the rails and the other of the sliders is supported by the other of the rails.

14. A saddle riding type vehicle, comprising:

a meter;
a wind screen provided in front of the meter; and
a wind screen elevating device that elevates and lowers the wind screen, the wind screen elevating device including
a pair of rails each
extending in a front-back direction of the vehicle,
having a front end thereof positioned below a rear end thereof, and
at least partly overlapping the meter in a side view of the vehicle,
a pair of sliders each
being supported by a respective one of the rails,
being movable along the respective one rail, and
including a plurality of sliding members that are arranged side by side in an extending direction that the respective one rail extends in,
a pair of support members coupled to the sliders and movable along the rails through the sliders, and
a coupling member that couples to each of the support members, the coupling member supporting the wind screen, the coupling member including support portions and a connection portion that connects the support portions, the support portions including wall portions that are attached to and in direct contact with the wind screen.

15. The saddle riding type vehicle according to claim 14, wherein the connection portion is positioned above the support portions.

16. A saddle riding type vehicle, comprising:

a meter;
a wind screen provided in front of the meter; and
a wind screen elevating device that elevates and lowers the wind screen, the wind screen elevating device including
a pair of rails each
extending in a front-back direction of the vehicle,
having a front end thereof positioned below a rear end thereof, and
at least partly overlapping the meter in a side view of the vehicle,
a pair of sliders each
being supported by a respective one of the rails,
being movable along the respective one rail, and
including a plurality of sliding members that are arranged side by side in an extending direction that the respective one rail extends in,
a pair of support members coupled to the sliders and movable along the rails through the sliders, and
a coupling member that couples to each of the support members, the coupling member supporting the wind screen, the coupling member being disposed above the support members so as to be disposed between the wind screen and the support members on a completely straight line.

* * * * *